United States Patent [19]

Dikmen

[11] 3,896,790

[45] July 29, 1975

[54] ALPHA BRAIN WAVE SENSOR
[75] Inventor: Ned Dikmen, Chicago, Ill.
[73] Assignee: Neuronics, Incorporated, Chicago, Ill.
[22] Filed: May 1, 1972
[21] Appl. No.: 249,166

[52] U.S. Cl. ...... 128/2.1 B; 129/2.1 E; 129/DIG. 4; 129/410; 129/418
[51] Int. Cl............................................ A61b 5/04
[58] Field of Search............ 128/2.1 B, 2.1 E, 2.1 R, 128/2.06 E, 2 E, DIG. 4, 410, 418

[56] References Cited
UNITED STATES PATENTS

| | | | |
|---|---|---|---|
| 1,099,062 | 6/1914 | Laposkey............................. | 128/410 |
| 2,426,958 | 9/1947 | Ulett, Jr. et al.................... | 128/2.1 B |
| 2,660,175 | 11/1953 | Thrasher et al...................... | 128/404 |
| 3,565,060 | 2/1971 | Sipple................................ | 128/2.06 E |
| 3,574,305 | 4/1971 | Muhl.................................. | 128/2.1 E |
| 3,623,477 | 11/1971 | Trent................................. | 128/2.1 B |
| 3,628,527 | 12/1971 | West.................................. | 128/2.06 B |
| 3,662,746 | 5/1972 | Saltzberg et al. ............... | 128/2.06 R |
| 3,753,433 | 8/1973 | Bakerich et al.................... | 128/2.1 B |

FOREIGN PATENTS OR APPLICATIONS
1,128,329  9/1968  United Kingdom........... 129/2.06 E OTHER PUBLICATIONS
The Washington Post, Sunday, April 30, 1972, section D3, "The Brainwave Explosion:"

Primary Examiner—Kyle L. Howell
Attorney, Agent, or Firm—Hume, Clement, Brinks, Willian, Olds & Cook, Ltd.

[57] ABSTRACT

A alpha brain wave sensor having a unique circuit and electrode construction permitting operation by mere surface contact of the electrodes with the human subject thereby obviating the need for electrode creams. The sensing electrode which has independent utility comprises a plurality of elongated, blunt ended prongs for extending through the normal hair of a subject into firm but comfortable contact with the scalp. The input stage of the circuit includes a pair of matched field effect type transistors coupled respectively to the sensing electrode and a reference electrode.

1 Claim, 3 Drawing Figures

PATENTED JUL 29 1975　　　　　　　　　3,896,790

ALPHA BRAIN WAVE SENSOR

FIELD OF THE INVENTION

The present invention relates generally to devices for sensing and providing an audible analogue of alpha frequency brain waves and, more particularly, is directed to a new and improved circuit and electrode design for such devices which obviate the need for electrode creams or other special preparations normally used to minimize the contact resistance between the electrodes and the skin of the human subject. Although the unique signal electrode design of the present invention is disclosed only in the context of an alpha brain wave device, those skilled in the art will recognize that the electrode structure also has utility in encephalographic devices or the like wherein it is required to effect an electrical contact with the scalp of a human subject.

BACKGROUND OF THE INVENTION

The brain which is composed of some billion nerve cells is a sophisticated biochemical factory. A ceaseless electro-chemical activity exists at all times within the brain, and it can be detected on the scalp by using sensitive electronic instruments. Scientists have recorded and classified according to wave shapes and rhythm many different electrical waveforms associated with different kinds of mental activity. The most common are: delta (0.5 – 4 cps), theta (4 – 8 cps), alpha (8–13 cps), beta (13–22 cps) and gamma (22–33 cps). There is some evidence that each of the foregoing rhythms or frequency ranges may be associated with a particular mental condition: alpha rhythm with tranquility, with eyes closed and lack of visual imagery; beta with tension, anxiety and intense concentration; theta with creative moods and daydreaming; and delta, which is found in infants and sleeping adults.

There is also evidence that the involuntary nervous system can, with proper training, be voluntarily controlled. For example, in recent years, scientific investigators have been reporting numerous results on subjects' abilities to control, purely at will, salivating, vomiting, heart rate, skin temperature, stomach secretion and respiration--all of which have generally been viewed as involuntary functions. If the internal conditions and rhythms of the different organs of the body are translated by electronic instruments into light or sound which the subject can see or hear, it has been found that he can with training learn to associate certain conditions and rhythms with particular light or sound patterns and ultimately to control the organs at will, at least in a limited fashion. This kind of learning process is known as automatic control by bio-feedback training.

The described bio-feedback training technique has found practical application in educating individuals to rid themselves of tension and anxiety and to induce a mental state of relaxation and tranquility by listening to the audible reproduction of their alpha frequency brain waves. Unfortunately, the utility of such devices in terms of convenient, non-clinical use is severely impaired by reason of the fact that heretofore it has usually been necessary to utilize an electrode cream to reduce the natural skin resistance. The electrode cream is costly, aesthetically repugnant and eventually results in some measure of corrosion of the metallic electrodes. It is also typical to shave that portion of the scalp at the rear of the head where one of the electrodes must be placed thereby further impairing practical utility.

SUMMARY OF THE INVENTION

A primary objective of the present invention is to provide a brain wave sensing device in which the need for electrode creams and other special preparations such as shaving a portion of the scalp is obviated.

The alpha brain wave sensing device of the present invention includes an electrode supporting headband that is quickly and easily installed about the head or removed, and which also is quite comfortable to wear. By reason of the unique design of the circuit of the device as well as the unique design of one of the electrodes, the device is capable of highly satisfactory performance by the mere placement of the dry metal electrodes in firm contact with the subject's head.

In accordance with the present invention, an alpha brain wave sensor includes an electrode system operative independently of an electrode cream for developing an audible indication of alpha frequency brain waves from a human subject. Specifically, the sensor comprises electrode means for effecting electrical contact with a human subject independently of an electrode cream including a reference electrode for positioning in direct contact with the forehead of the subject, a signal electrode having an electrically conductive member extending through the normal hair of the subject for making electrical contact with the scalp in the region above the occipital lobes, and a ground electrode also coupled to the subject. Signal amplifying means are provided comprising a pair of impedance matched field effect type transistors having individual inputs coupled to the reference and signal electrodes, respectively, and with each of the transistors having an input impedance substantially greater than the surface contact resistance between the reference and signal electrodes and the subject. The amplifying means also includes a differential type transistor amplifier coupled to the respective outputs of the field effect transistors for amplifying the difference of the signal outputs of the field effect transistors. High pass filter means are included within the amplifying means for attenuating signals outside of the 8 to 13 cycle per second alpha frequency range. The sensor further includes sound developing means coupled to the amplifying means for converting the alpha frequency signals developed by the amplifying and bandpass filter means into audible sounds.

Another feature of the present invention is directed to the specific electrode design for effecting an electrical contact with the scalp of human subject through normal length hair independently of an electrode cream. This electrode which has utility in electroencephlographic applications or the like comprises a plurality of electrically conductive prongs each having a blunted end portion. Each prong is of a length sufficient for extending through the hair of the subject with the blunted end portion in firm, nonpenetrating contact with the scalp. A support plate means is provided for electrically interconnecting and for physically supporting the plurality of prongs in a predetermined spaced relation relative to one another to permit free hair flow intermediate the prongs.

BRIEF DESCRIPTION OF THE DRAWINGS

The novel features of the present invention are set forth with particularity in the appended claims. The invention together with further objects and advantages thereof may best be understood, however, by reference to the following description taken in conjunction with the accompanying drawings in the several figures of which like reference numerals identify like elements and in which:

DESCRIPTION OF THE PREFERRED EMBODIMENTS

Figure 1:
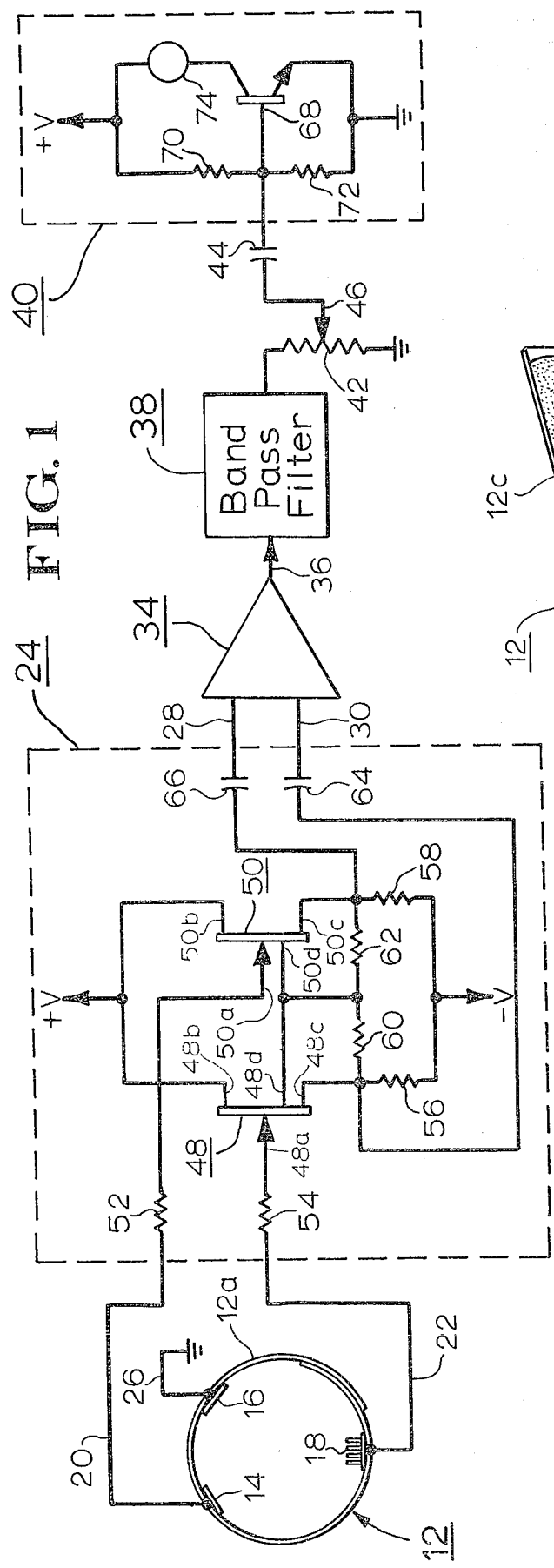
FIG. 1 is a semi-schematic illustration of an alpha brain wave sensing device embodying the present invention.

Referring now to FIG. 1, the brain wave apparatus of the invention there illustrated is adapted to provide an aural analog of alpha frequency brain waves by mere contact of appropriate signal electrodes with a patient and independently of the use of any electrode creams or the like. To this end, the apparatus includes a head band structure 12 having three individual electrodes supported in spaced intervals about the periphery of a flexible band 12a. Specifically, and as will be described in detail later herein, the headband structure 12 includes a reference electrode 14, a ground electrode 16 and a unique sensing electrode 18. The electrodes 14 and 16 are properly positioned on opposite sides of the subject's forehead while the sensing electrode 18 is properly located at the rear of the subject's head just above the occipital lobes. Preferably, the reference and sensing electrodes 14 and 18, respectively, are equidistant from the ground electrode 16 such that the electrodes cooperatively define an isosceles triangle, although this is not critical to proper operation of the device.

The electrodes 14 and 18 are coupled by conductive leads 20 and 22 to a high impedance input circuit illustrated within the dashed outline 24. The electrode 16 is coupled to ground by a conductor 26. As will be illustrated in detail later herein, the conductor 26 is preferably fashioned as a hollow conductive shield about the insulated signal views 20 and 22 thereby to shield these wires from extraneous electrical signal activity.

The input circuit 24 comprises individual field effect transistor amplifiers for developing at output terminals 28 and 30 an amplified version of the signals on input conductors 20 and 22, respectively. A conventional differential amplifier 34 is coupled to receive the signals on leads 28 and 30 as inputs and to amplify the difference of the input signals to develop a differential output signal on the single output lead 36.

Since it is desired to monitor only a portion of the brain wave activity, there is provided a bandpass filter 38 for attenuating signals outside of the desired frequency range, in this instance signals outside of the normal 8 to 13 cycle per second alpha frequency range. Of course, the effective width of the frequency band may vary somewhat according to the sharpness of the filtering action and the desired outer limits of the pass frequency range. The bandpass filter 38 may be of conventional design and therefore is illustrated only in diagrammatic form. Additionally, it will be understood that the filter 38 is typically an integral portion of the operational amplifier 34, the devices 34 and 38 being separately depicted in the drawing solely for convenience of illustration.

The alpha frequency signals developed at the output of the bandpass filter 38 are coupled by a potentiometer 42 and a coupling capacitor 44 to a sound developing means denoted within the dashed outline 40 wherein these signals are converted. One end of the potentiometer 42 is coupled to the output of filter 38 while the opposite end is grounded. A manually adjustable center tap 46 for potentiometer 42 permits adjustable selection of a sensitivity or threshold level for the sound developing means 40.

The structure of the circuit of the invention will now be described in detail. In this regard, it should be recognized that the surface contact resistance between the untreated electrodes 14, 16 and 18 and the skin of a human subject is typically on the order of 100,000 to 200,000 ohms, but may vary widely according to the surface condition of the subject's skin. This is to be contrasted with the approximately 10,000 ohm contact resistance which results when suitable electrode creams are utilized. It has been found that conventional amplifier input circuits are not acceptable at these higher and variable impedances. In accordance with the present invention, the input amplifier 24 is of a design providing an extraordinarily high input impedance on the order of 10 megohms so that the increased and varying contact resistance incurred in the absence of an electrode cream or the like does not materially affect signal quality. Specifically, the input amplifier 24 includes a pair of matched dual field effect type transistors 48 and 50. The transistors 48 and 50 as well as the associated passive components are preferably formed as a single integrated circuit ship. Acceptable circuit chips are available from a variety of commercial sources.

The transistors 48 and 50 have their respective gate electrodes 48a and 50a coupled to signal leads 22 and 20, respectively, through identical input resistors 52 and 54. The respective drain electrodes 48b and 50b are coupled in common to a source of positive operating potential +V while the respective source electrodes 48c and 50c are coupled to an operating supply −V of equal magnitude and opposite polarity through identical load resistors 56 and 58. The supply voltage may be obtained from conventional 9 volt storage batteries. Substrate terminals 48d and 50d of transistors 48 and 50 are coupled in common and thence to their respective source electrodes through individual resistors 60 and 62. The electrical signals developed at the source electrodes 48c and 50c of transistors 48 and 50 respectively are coupled as separate inputs to the differential amplifier 34 through individual coupling capacitors 64 and 66.

The signal developing means 40 illustrated within the dashed outline in the drawing may, consistent with the present invention, take any of a variety of conventional forms. The structure illustrated comprises a conventional PNP transistor 68 coupled in a grounded emitter configuration. Alpha frequency signals are applied to the base of transistor 68 through the coupling capacitor 44. A suitable operating bias is applied to the transistor base from the center tap of a voltage divider network comprising series resistors 70 and 72 coupled from a source of positive operating potential +V to ground. The collector of transistor 68 is like-wise connected to the operating supply +V through a conventional crystal oscillator 74. During intervals when the transistor 68 is rendered conductive by the signals at its base, the crystal 74 oscillates at its natural resonant frequency, preferably a frequency in the lower portion of the audible range which is pleasant to the human ear, such as 600 cycles per second. The oscillator 74 is silent or off whenever transistor 68 is nonconductive. The threshold sensitivity level of transistor 68 to input signals is varied by adjusting the manually moveable tap 46 of potentiometer 42.

Figure 2:
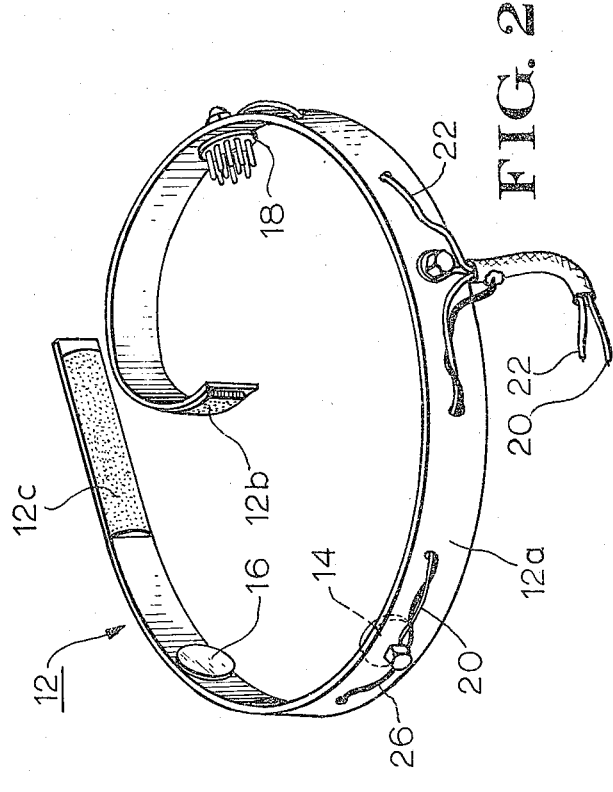
FIG. 2 is an enlarged, perspective view of the electrode band 12 of FIG. 1.

Referring now to FIG. 2, a better understanding may be had of the headband structure 12 as well as the electrode design 18 of the present invention. Specifically, the headband 12 comprises an elongated strip 12a of a rugged yet easily flexible material, such as plastic or leather. The band 12a is of a length to easily accommodate varying head sizes with the opposed terminal portions of the band being arranged for adjustable interconnection to one another to secure the band firmly to the head of a wearer. In the present embodiment, the interconnection is effected by adhesion of a nylon and a felt-like material 12b and 12c disposed on the opposite end portions of the band 12a.

The electrodes 14 and 16 herein are in the form of flat conductive discs on the order of one inch in diameter and preferably composed of bronze with an overlay of gold. Bolts secured to the backsides of electrodes 14, 16 are inserted through respective holes in the band 12a and crown nuts are threadably connected to the bolts to secure the electrodes to the band.

As previously stated, the electrodes 14 and 16 are adapted for positioning on opposite sides of the forehead of a human subject. On the other hand, the remaining electrode 18 is required to effect electrical contact with the scalp at the back of the head in a region that is (normally at least) covered with a heavy layer of hair. Conventional planar electrodes of the type of electrodes 14 and 16 have been found totally unsuitable for this application unless the scalp is shaved.

Figure 3:
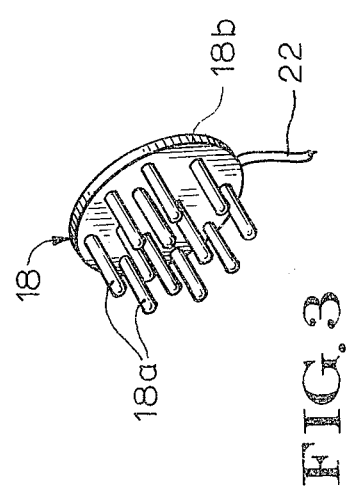
FIG. 3 is a detailed view of the unique signal electrode 18 of FIG. 2.

In accordance with the present invention, the necessity for any special preparation whatever of the scalp is obviated by use of the unique electrode design 18. As perhaps may be best appreciated by momentary reference to FIG. 3, the electrode 18 comprises a plurality of elongated, electrically conductive prongs 18a each having a blunt end portion and each being of a length sufficient for extending through the hair of the subject with the blunted end portion in firm, non-penetrating contact with the scalp. To this end, the prongs 18a in the preferred embodiment are approximately one-half inch in length. A support plate means 18b is provided for electrically interconnecting and for physically supporting the prongs 18a in a predetermined spaced relation relative to one another to permit free hair flow intermediate the prongs. Preferably the support plate 18b is in the form of a planar disc as shown of about one inch in diameter although those skilled in the art will recognize that other configurations and sizes may be acceptable, depending upon the environment of use. It has also been found preferable to place the prongs 18a in a regular array with a spacing between one another of approximately one-eighth inch. This spacing is sufficiently large to permit substantially unimpeded hair flow intermediate the prongs while assuring a reasonably high density of prongs so that the signals are detected from a single locale. The prongs themselves are approximately 3/32 inch in diameter with their bases welded or the like in secure mechanical and electrical contact with the support plate 18b. The prongs may be of unequal length in order to better conform to the contour of the head or, alternatively, the prongs may be of equal length and the base plate contoured to alter the effective length of the prongs.

The electrode 18 in the present embodiment is likewise preferably composed of bronze with an overlay of gold and is fitted with a bolt on its backside to facilitate securance to the band 12a. As seen in FIG. 2, the electrical leads are secured to the electrodes about the respective bolt portions thereof and the leads are dressed about the perimeter of the band 12a so that only a single electrical cord extends from the band. As previously mentioned, the ground lead from electrode 16 is in the form of a conductive sheath 26 surrounding the electrical signal leads 20 and 22 that are coupled to electrodes 14 and 18, respectively. The sheath 26 is connected to the same ground as the chasis of the electrical apparatus.

In operation, the band 12 is placed about the head of the wearer with the electrodes 14 and 16 properly located on opposite sides of the forehead and with the prongs of the electrode 18 manually adjusted to extend through the hair and into contact with the scalp, in the region just above the occipital lobes of the brain. With the band encircling the head, the terminal portions of the band 12b and 12c are drawn past one another such that the electrodes press firmly yet confortably on the wearer's head, after which the terminal portions are pressed together to secure the headband in place.

It is preferred that the wearer be comfortably situated in a quiet room having little or no distractions. Physical activity should also be minimized since muscle movements, such as blinking of the eyes, develop signals of a magnitude significantly greater than the 50 microvolt level of the alpha frequency brain waves. Under the foregoing conditions, the sensitivity of the device is correctly set by moving the adjustable tap 46 of the potentiometer 42 to a point where the device may be quieted by relaxing all muscles and where a clear, clean response is obtained by blinking the eyes.

The electrical signals detected by the electrodes 14 and 18 and developed on the respective conductors 20 and 22 are applied to the gate electrodes 50a and 48a of the matched dual field effect transistors 48 and 50. As previously indicated, the input impedance of each of the field effect transistors 48 and 50 is so high, (approximately ten megohms) that the 10,000 to 500,000 ohm surface contact resistance between the electrodes 14, 16 and 18 on the one hand, and the subject's skin on the other is insignificant by comparison. Thus, the brainwave signals applied to and amplified by the transistors 48 and 50 are substantially independent of electrode-skin contact resistance.

The transistors 48 and 50 develop in conventional fashion amplified signals at their respective source electrodes that are proportional to the brain wave signals detected by the electrodes 18 and 20, respectively. These signals are communicated through coupling capacitors 64 and 66 to a conventional differential amplifier 34 at the output of which is developed an amplified difference of the signals on the input leads 28 and 30. Signals outside of the 8–13 cycle per second alpha frequency range are attenuated by the bandpass filter 38 which, as previously mentioned, is most typically an integral part of the amplifier 34. The filtered alpha signals are coupled from the adjustable tap 46 of the sensitivity setting potentiometer 42 through a coupling capacitor 44 to the base transistor 68.

Transistor 68 is normally non-conductive or off but is rendered conductive for the duration of an input signal of appropriate polarity applied to its base electrode. During periods of conduction of transistor 68, the crystal 74 oscillate at its natural frequency, which for the pleasure of the listener, is prefereably in the lower end of the audio frequency range, such as 600 cycles per second. By developing an awareness of the mental and physical conditions that produce the most continuous and rhymthic audible sounds from crystal 74, a subject may learn to train his system so as to improve his ability in alpha wave production.

While particular embodiments of the present invention have been shown and described, it is apparent that various changes and modifications may be made, and it is therefore intended in the following claims to cover all such modifications and changes as may fall within the true spirit and scope of this invention.

I claim:

1. An alpha brain wave sensor including an electrode system and adapted to be operative independently of an electrode cream for developing an audible reproduction of alpha frequency brain waves from a human subject, comprising:

electrode means for effecting electrical contact with a human subject independently of an electrode cream including a reference electrode adapted for positioning in direct contact with the forehead of said subject, a signal electrode comprising an electrically conductive, non-apertured electrode base plate means and a plurality of electrically conductive rod members on the order of one-half inch in length disposed in spaced parallel relation and each having one blunt end portion adapted for extending through the hair of said subject to effect electrical non-penetrating contact with the scalp in the region above the occipital lobes and an opposite end portion affixed to said electrode base and a ground electrode adapted to be coupled to said subject, said reference and ground electrodes comprising planar metal discs, said base plate means, comprising a rigid, non-apertured, planar metal disc fixedly secured to said opposite end portion of each of said rod members with said rod members for electrically interconnecting and for physically supporting said rod members in a predetermined spaced relation relative to one another to permit free hair flow intermediate the prongs, signal amplifying means comprising a pair of impedance matched field effect type transistors having individual inputs coupled to said reference and signal electrodes by respective electrical signal conductors, with each of said transistors having an input impedance substantially greater than the surface contact resistance between said reference and signal electrodes and said subject and further having individual outputs, and a differential type transistor amplifier coupled to said individual outputs for developing an amplified difference of said signal outputs of said field effect transistors;

band pass filter means included within said amplifying means for attenuating signals outside of the eight to thirteen cycle per second alpha frequency range;

sound developing means coupled to said amplifying means for converting the alpha frequency signals developed by said amplifying means and said band pass filter means into audible sounds, said sound developing means comprising an oscillator having a natural oscillation frequency within the lower portion of the audible range, said amplifying means being coupled to said sound developing means through a potentiometer for permitting manual adjustment of the threshold sensitivity level of said sound developing means, said electrode means including a support band for fitting about the head of said subject and carrying said reference and ground electrodes thereon in spaced relation for contact with the forehead of said subject and further carrying said signal electrode, spaced relative to reference and ground electrodes, for contact with the scalp in the region above the occipital lobes, said support band having aperture means therein, said reference electrode, ground electrode and signal electrode having conductor means associated therewith and extending in said aperture means in said support band.

* * * * *